(12) United States Patent
Tweet et al.

(10) Patent No.: US 7,018,317 B2
(45) Date of Patent: Mar. 28, 2006

(54) RECREATIONAL VEHICLE LOCKING DIFFERENTIAL

(75) Inventors: Ole Tweet, Thief River Falls, MN (US); Owen Stenvik, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/434,518

(22) Filed: May 7, 2003

(65) Prior Publication Data
US 2004/0224812 A1    Nov. 11, 2004

(51) Int. Cl.
*F16H 48/24*    (2006.01)

(52) U.S. Cl. .................. 475/222; 475/231; 475/237

(58) Field of Classification Search ........... 475/222, 475/231, 237
See application file for complete search history.

(56) References Cited

U.S. PATENT DOCUMENTS

| | | | | |
|---|---|---|---|---|
| 3,215,000 A * | 11/1965 | Senkowski | ........... | 475/237 |
| 3,777,837 A * | 12/1973 | Harper | ........... | 475/237 |
| 3,908,775 A * | 9/1975 | Van Fossen | ........... | 475/237 |
| 4,341,281 A * | 7/1982 | Nagy | ........... | 180/247 |
| 4,703,671 A * | 11/1987 | Jikihara | ........... | 475/231 |
| 4,788,888 A * | 12/1988 | Tsutsumikoshi | ........... | 475/237 |
| 5,041,069 A * | 8/1991 | Horst | ........... | 475/231 |
| 5,139,467 A * | 8/1992 | Carpenter | ........... | 475/231 |
| 5,570,755 A * | 11/1996 | Fruhwirth et al. | ........... | 180/249 |
| 6,432,020 B1 * | 8/2002 | Rivera et al. | ........... | 475/231 |
| 6,450,915 B1 * | 9/2002 | Kazaoka et al. | ........... | 475/231 |
| 6,481,548 B1 * | 11/2002 | Monahan et al. | ........... | 192/38 |
| 6,491,126 B1 * | 12/2002 | Robison et al. | ........... | 180/233 |
| 6,620,073 B1 * | 9/2003 | Kazaoka et al. | ........... | 475/231 |
| 6,634,978 B1 * | 10/2003 | Banno et al. | ........... | 475/222 |
| 6,695,086 B1 * | 2/2004 | Kawamoto | ........... | 475/237 |

OTHER PUBLICATIONS

Parts drawing for Suzuki vehicle model King Quad 300, (date unknown).
Parts drawings for Yamaha vehicle model Grizzly 650, (date unknown).
Parts drawings for Kawasaki vehicle model Prairie 650, (date unknown).

* cited by examiner

*Primary Examiner*—Sherry Estremsky
(74) *Attorney, Agent, or Firm*—Black Lowe & Graham PLLC; Darren J. Jones

(57) ABSTRACT

The present invention relates to a transmission for a recreation vehicle, such as an all-terrain vehicle that includes a locking assembly for locking a differential joint in the front- or rear-end portion of the transmission. A vehicle having both front and rear differentials may include separate locking assemblies for each differential to lock and unlock the differentials for various combinations of power allocation to wheels of the vehicle. A differential joint according to the invention may include a ring gear and spider gears that drive a universal joint coupled to wheels of the vehicle. A coupler of the locking assembly includes an inner surface configured to engage outer surfaces of the ring gear and the universal joint, and an outer surface configured to be engaged by an actuator. The actuator adjusts the coupler between a locked position wherein the ring gear and the universal joint are locked together, and an unlocked position wherein the universal joint is free to rotate relative to each other. The coupler preferably has a relatively thin width so as to minimize a track width of the vehicle.

33 Claims, 5 Drawing Sheets

RECREATIONAL VEHICLE LOCKING DIFFERENTIAL

BACKGROUND OF THE INVENTION

1. Field of the Invention

The present invention relates to all-terrain vehicle (ATV) drive systems, and more specifically relates to differential joints for a rear transmission and to locking mechanisms for locking differential joints to universal joints of a vehicle transmission.

2. Related Art

Most powered vehicles with front end steering capabilities include some type of differential joint and an associated pair of universal joints, such as a constant velocity (CV) joints, positioned on opposing sides of the differential joint in a front end portion of the transmission assembly. A differential joint facilitates rotation of the opposing universal joints at different speeds. This feature is particularly useful when turning a vehicle because it facilitates a smaller turning radius with less friction resistance between the wheels and a surface over which the vehicle moves.

One disadvantage of differential joints is that they typically add additional width to the vehicle transmission and/or track. Transmission and track width are directly correlated with the clearance of the vehicle for a given wheel size and vehicle suspension and frame. In recreational vehicles, such as ATVs, it is often desirable to minimize the transmission and/or track width to improve vehicle clearance. For this and other reasons, there has not been an effective differential joint put into practice for an ATV rear-end transmission portion.

Many known vehicle drive systems are equipped with differential locking mechanisms to lock the differential and ensure that power from the vehicle engine is allocated to specified wheels of the vehicle. Although locking the differential may significantly reduce the turning capabilities of the vehicle, locking the differential makes it possible to allocate equal amounts of power to each wheel associated with that differential joint regardless of whether one of the wheels would normally spin freely (little or no traction for that wheel).

Differential locking mechanisms are typically positioned in the differential joint and between the opposing universal joints of a transmission. Such locking mechanisms are preferably adjustable from an unlocked to a locked position to control power allocation to the universal joints. One disadvantage of most locking mechanisms is that they tend to widen the vehicle transmission and/or track width. As discussed above, a wider transmission and/or track may have undesirable limitations in some applications. Another disadvantage of some locking mechanisms is their complexity in design and the inherent reworking of the transmission that is required to implement the locking mechanism into the transmission.

SUMMARY OF THE INVENTION

All-terrain vehicles (ATVs) generally include a frame that defines an engine compartment, an engine positioned within the engine compartment, a transmission powered by the engine, a suspension system, a set of wheels secured to the suspension and transmission, a set of handlebars, and a straddle mount seat. One aspect of the invention relates to an ATV transmission that includes a rear transmission assembly configured to control a set of rear wheels. The rear transmission assembly includes a rear differential assembly coupled to the rear wheels and a locking coupler configured to lock the rear differential assembly to fix a rotation of the rear wheels together.

Another aspect of the invention relates a method of controlling allocation of power in an ATV. The ATV includes a transmission assembly having a rear transmission portion and a rear set of wheels driven by the rear transmission portion. The rear transmission portion includes a rear differential and a rear locking coupler configured to lock the rear differential. The method includes adjusting the rear locking coupler between a locked and an unlock position to control allocation of power from an engine of the ATV to the rear wheels. Locking the rear differential assembly with the rear locking coupler provides equal allocation of power from the engine to the rear wheels, and unlocking the rear differential assembly with the rear locking coupler facilitates variable allocation of power from the engine to each of the rear wheels.

Another aspect of the present invention relates to a locking assembly configured to couple a differential joint to first and second universal joints of a vehicle transmission assembly that are positioned at opposite sides of the differential joint. A coupler of the locking assembly includes an external surface and an internal surface with the internal surface being configured for engaging an external surface of the differential joint and an external surface of the first universal joint. An actuator of the locking assembly includes an actuator capable of engaging the external surface of the coupler to move the coupler between an engaged position and a disengaged position. The coupler, when in the engaged position, is capable of securing the differential joint to the first universal joint such that the first and second universal joints rotate together.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

DETAILED DESCRIPTION OF THE PREFERRED EMBODIMENT

The present invention relates to a rear transmission having differential capabilities, and locking mechanisms for locking differential joints of a vehicle transmission. Differential joints are typically associated with front-end portions of an all-terrain vehicle (ATV) vehicle transmission to improve the turning radius and ease in turning the vehicle. One aspect of the invention relates to an ATV transmission that includes a rear transmission assembly that includes a rear differential joint coupled to rear wheels of the ATV. A rear differential may also improve the turning radius and ease in turning the vehicle either in combination with a front differential or when used alone. Another aspect of the invention relates to a rear locking coupler that is configured to lock the rear differential to fix rotation of the rear wheels together for improved power distribution to the rear wheels.

The locking coupler of the present invention may include an inner surface configured to engage an outer surface of a ring gear of the differential assembly and an outer surface of a universal joint positioned adjacent to the differential assembly. An outer surface of the coupler is configured to be engaged by an actuator to move the coupler between a locked position, wherein the coupler locks the ring gear and the universal joint together, and an unlock position, wherein the ring gear and the universal joint are free to rotate relative to each other. The locking assembly is configured and positioned relative to other features of the transmission assembly so as to minimize the overall track width of the vehicle.

Figure 1:
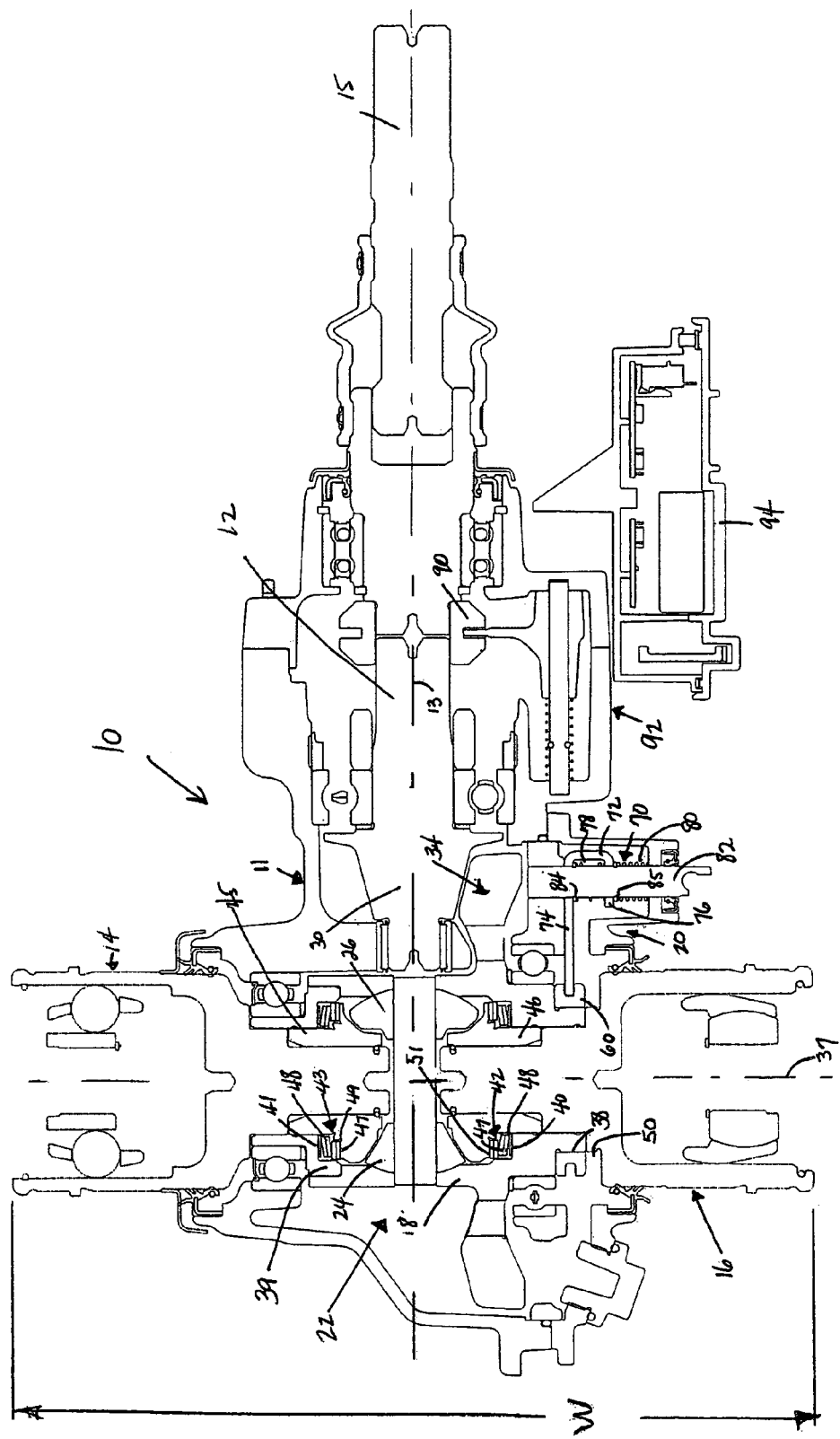
FIG. 1 is a cross-sectional view of one example of a vehicle transmission having locking assembly features according to principles of the present invention.
Figure 4:
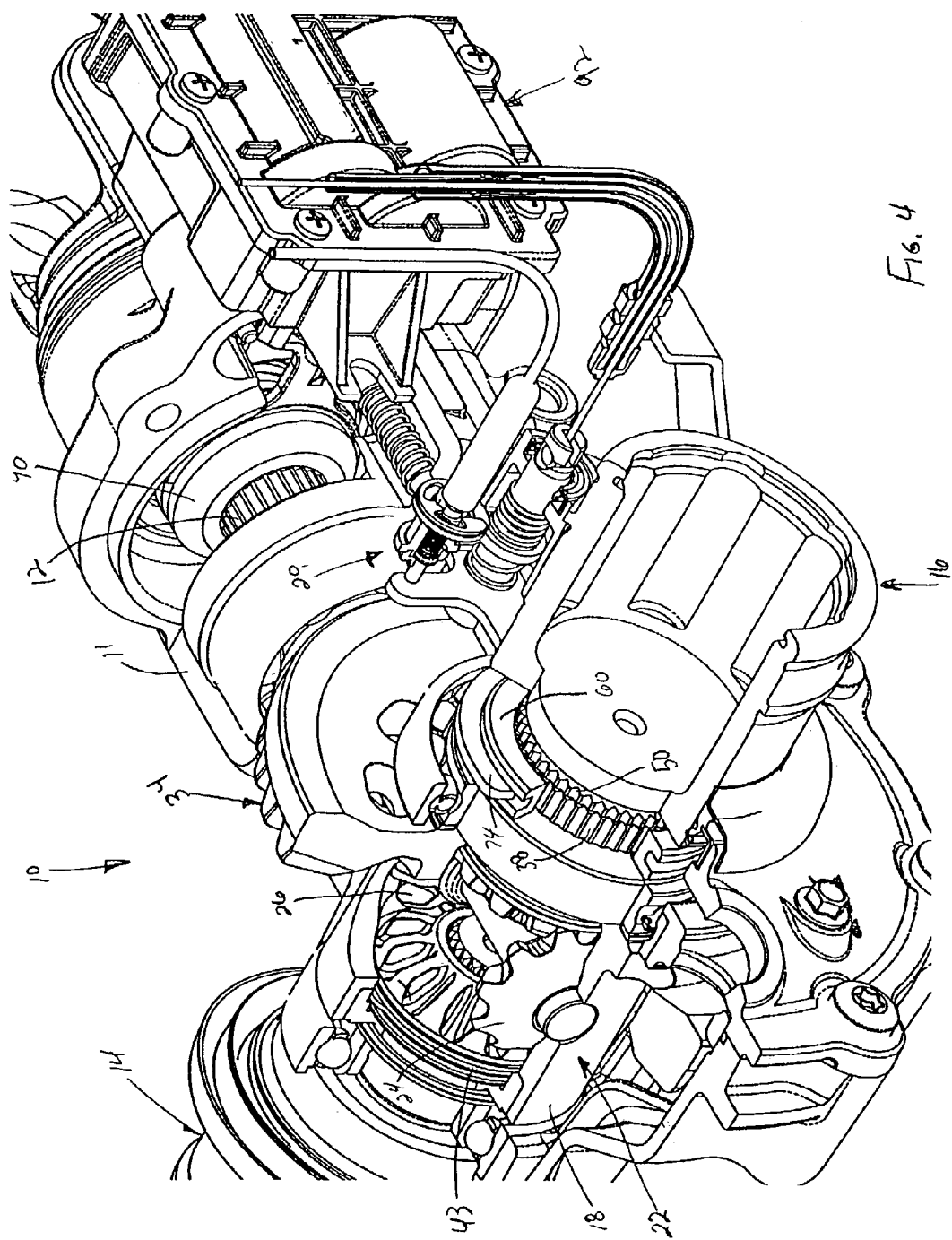
FIG. 4 is a partially cut away perspective view of the transmission shown in FIG. 1.

FIGS. 1 and 4 illustrate a cross-sectional view of one example of a vehicle transmission 10 that includes locking features of the present invention. Transmission 10 may be either a transmission front-end portion (for controlling operation of the front wheels of the vehicle) or a rear-end portion (for controlling operation of the rear wheels of the vehicle). Transmission 10 includes a casing 11, an input shaft 12, first and second universal joints 14, 16, a locking assembly 20, and a differential assembly 22. Differential assembly 22 includes a ring gear 18 and spider gears 24, 26. A vehicle engine (not shown) powers transmission 10 through a drive shaft 15 that rotates ring gear 18. Drive shaft 15 may be engaged or disengaged from input shaft 12 with a drive coupler 90 of a drive actuator assembly 92.

When locking assembly 20 is in a disengaged position, the input shaft 12 engages and rotates ring gear 18, ring gear 18 moves spider gears 24, 26, and spider gears 24, 26 rotate universal joints 14, 16 that then rotate wheels of the vehicle (not shown). However, when locking assembly 20 is in a disengaged position, spider gears 24, 26 are free to rotate relative to the rotational motion of the ring gear. As a result, universal joints 14, 16 may rotate at different rotation rates, which is typically desired when the vehicle is turning. When the locking assembly 20 is in an engaged position, ring gear 18 is essentially locked directly or indirectly to first and second universal joints 14, 16 so that spider gears 24, 26 are bypassed and variable rotational rates of universal joints 14, 16 is prohibited. When ring gear 18 is locked to universal joints 14, 16, equal amounts of power are allocated from input shaft 12 to each of the universal joints 14, 16.

Input shaft 12 includes a gear 30 fixed at one end that is configured to engage a gear surface 34 of ring gear 18. Gears 30 and 18 translate rotational motion along an axis 13 of input shaft 12 into rotational motion about an axis 37 extending between first and second universal joints 14, 16.

Ring gear 18 includes a first outer surface 38 and first and second transverse surfaces 40, 41. First and second transverse surfaces 40, 41 are configured for mounting a portion of first and second slip differentials 42, 43 that are associated with differential assembly 22. Outer surface 38 is configured to engage a portion of locking assembly 20. First universal joint 16 also includes an outer surface 50 that is configured to engage the same portion of locking assembly 20 that is engaged by the outer surface 38 of ring gear 18. Preferably, outer surfaces 38, 50 include splines or a like feature that promotes engagement between surfaces 38, 50 and surfaces of locking assembly 20.

Figure 2:
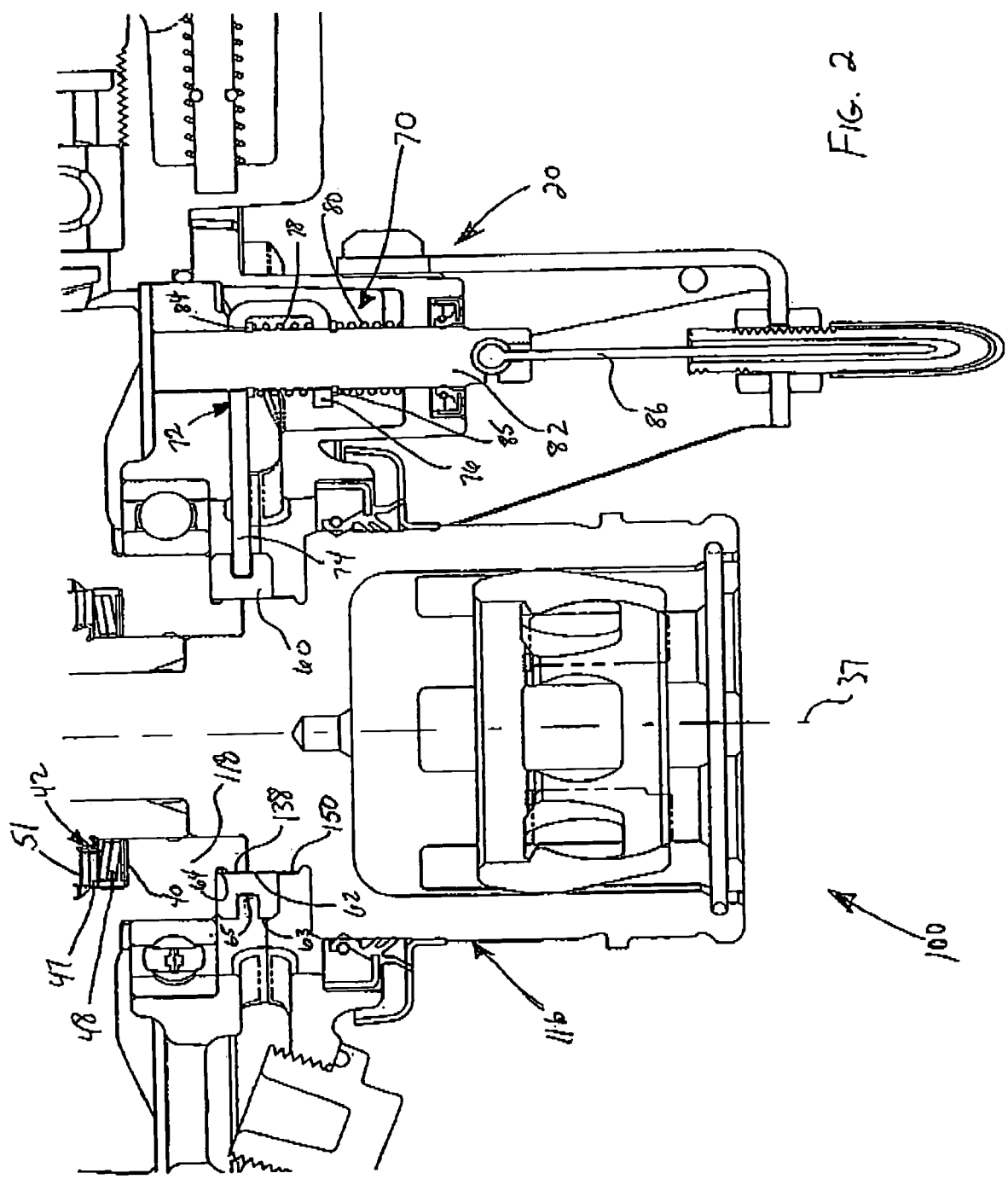
FIG. 2 is a close-up view of a second example of a vehicle transmission having locking features according to principles of the present invention.

The limited slip differentials 42, 43 each include a plurality of rings 47, 48, arranged in contact with each other (see FIGS. 1, 2 and 4). The rings 47, 48 of each limited slip differential 42, 43 are arranged axially in a direction along the axis 37 and are in contact with each other. A ring 47 of each limited slip differential 42, 43 engages a respective transverse surface 49, 51 of the side gears 45, 46. The rings 47 may be aligned such that a primary surface (not shown) of each ring 47 is arranged substantially perpendicular to the axis 37. A ring 48 of each limited slip differential 42, 43 engages a respective transverse surface 40 41. The rings 48 may be arranged with a primary surface (not shown) of each ring 48 at an angle relative to the orientation of the rings 47.

The ring gear 18 defines transfer surface 40. The transverse surface 41 is defined by a collar member 39 that is secured to one side of the ring gear 18. The transverse surfaces 40, 41, 49, 51 each face in a direction substantially parallel to the axis 37. The configuration and arrangement of the limited slip differentials 42, 43 provide limited movement of the side gears 45, 46 relative to the ring gear 18 directly or relative to the ring gear 18 via the associated collar member 39. The limited slip differentials 42, 43 maintain the same orientation and arrangement shown in the FIGS. during use of the transmission 10 and regardless of the locked or unlocked state of the locking member 20.

Figure 3:
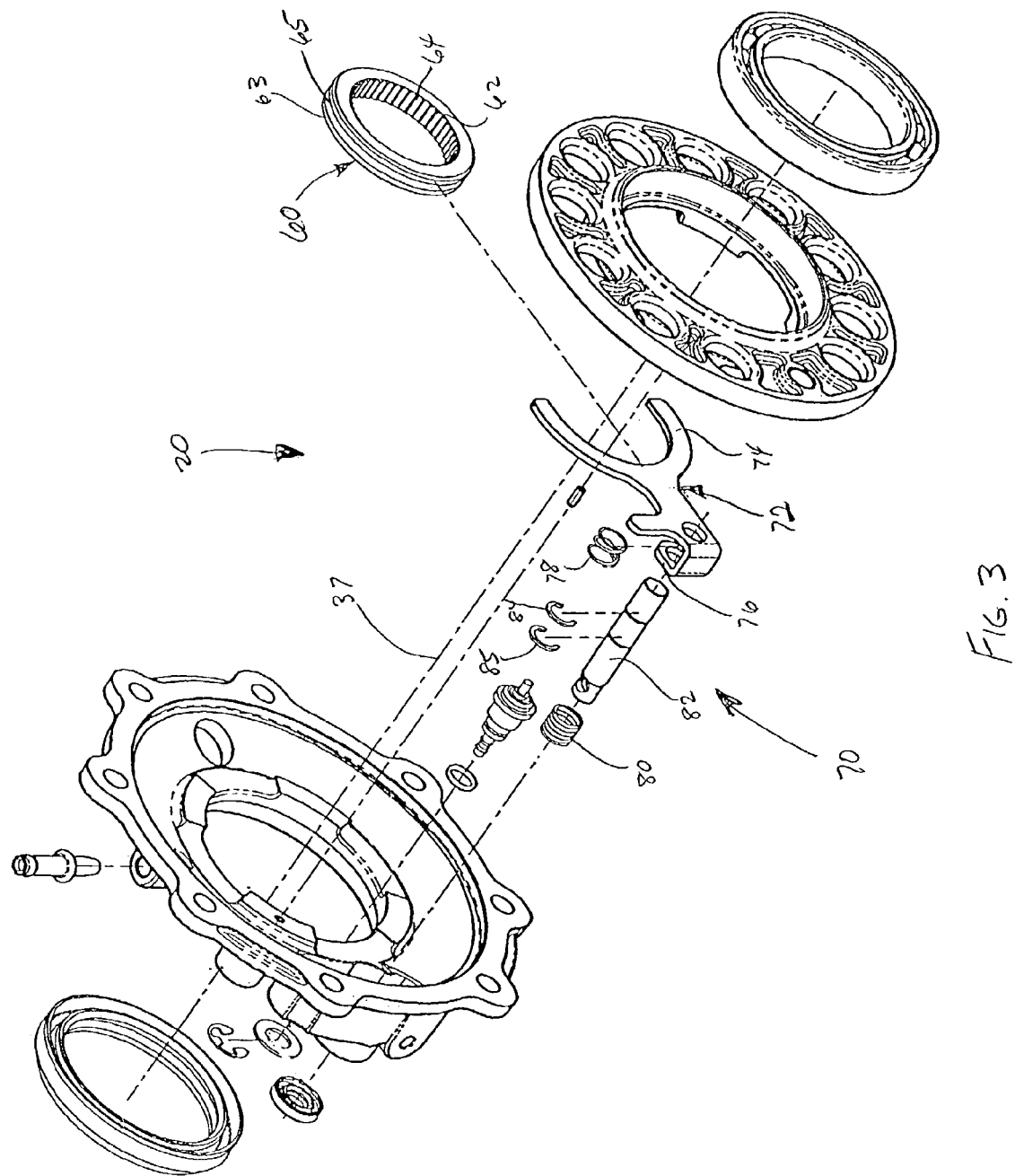
FIG. 3 is an exploded perspective view of some of the locking assembly features shown in FIG. 1.

Referring now to FIG. 3, locking assembly 20 includes a locking coupler 60 with an inner surface 62 and an outer surface 63. Preferably, the inner surface 62 includes splines 64 or other connecting features that engage connecting features of outer surfaces 38 and 50 of ring gear 18 and second universal joint 16, respectively (see FIG. 4). Outer surface 63 preferably includes a groove 65 or other feature configured for engagement by an actuator to move locking coupler 60 between engaged and disengaged positions.

Locking assembly 20 also includes an actuator assembly 70 that includes a fork member 72 having a first portion 74 and a second portion 76, a first biasing member 78, a second biasing member 80, a shaft 82, and first and second retaining clips 84, 85. Actuation of actuator assembly 70 may be controlled by a cable (see FIGS. 2 and 4) or a like feature, such as an electronic solenoid (for example, see actuating solenoid 94 shown in FIG. 1 that actuates drive coupler 90) that moves shaft 82 in a direction parallel to axis 37, thereby moving fork member 72 in the same direction. Moving fork member 72 moves locking coupler 60 between an engaged position (coupling ring gear 18 and universal joint 16 together) and a disengaged position (engaging only the ring gear 18 or the universal joint 16). First and second biasing members 78 and 80 are held in place on shaft 82 between first and second portions 74, 76 and first and second retaining clips 84, 85. Biasing members 78, 80 exert forces upon fork member 72 when shaft 82 is moved in a longitudinal direction, thereby urging locking coupler 60 into engaged or disengaged positions.

FIG. 1 illustrates locking coupler 60 in a disengaged position with locking coupler 60 positioned completely removed from universal joint 16 so that ring gear 18 and second universal joint 16 are disengaged from each other and can rotate freely relative to each other. FIG. 2 shows a portion of a second example transmission 100 (similar features shown in FIGS. 1 and 2 having the same or similar reference numbers) wherein an outer surface 150 of second universal joint 116 is configured such that locking coupler 60, when in the disengaged position, is positioned on universal joint 116 and completely disengaged from a surface 138 of ring gear 118.

When in the engaged position, locking coupler 60 overlaps outer surfaces 38, 138 and 50, 150, thereby locking/coupling ring gear 18, 118 to second universal joint 16, 116. When coupled together, locking coupler 60, ring gear 18, 118 and second universal joint 16, 116 must rotate together at the same speed and cannot move relative to each other, for example, due to a slipping action that may occur via slip differential 42.

The locking assembly of the present invention provides a compact, simple way of locking a ring gear to a universal joint. As shown in FIGS. 1–4, coupler 60 is relatively thin in the direction of axis 37 so as to add very little width to the overall transmission width (for example, width (W) measured between first and second universal joints 14, 16 shown in FIG. 1). As a result, a locking assembly of the present invention makes it possible to maximize the clearance for a vehicle that incorporates a transmission having features of the present invention. The position and configuration of the locking assembly relative to the universal joints also makes it possible to easily actuate the locking assembly, such as, for example, with a cable (as shown in FIGS. 2 and 4) or an electronic solenoid (see FIG. 5) that is operated by controls that are conveniently positioned, for example on the handlebars of the vehicle, for actuation by an operator of the vehicle.

The positioning of locking coupler 60 at an end of ring gear 18, 118 may promote some flexibility in the design of a ring gear outer surface to which locking coupler 60 is engaged. In some embodiments, the connecting surfaces between locking coupler 60 and the outer surfaces 38, 138 and 50, 150 of ring gear 18, 118 and second universal joints 16, 116 may be configured differently while providing the same function. For example, the surfaces may be configured with flats, such as those flats on the outer surface of the head of a bolt. In such an embodiment, first and second biasing members 78, 80 would provide tension on fork 72 that would allow the respective flat surfaces to rotate into a proper position so that flats on the inner surface of locking coupler 60 could slide onto and engage the outer surfaces 38, 138 and 50, 150. In other embodiments, the splines may be slightly slanted to promote easier engagement and disengagement between locking coupler 60 and outer surfaces 38, 138 and 50, 150.

In other embodiments, the locking assembly may also have different or additional features than those shown in FIGS. 1–4. For example, fork 72 may include only a first portion 74, or, in other embodiments, may include an end that is configured to engage a protrusion rather than a groove on outer surface 63 of locking coupler 60.

Figure 5:
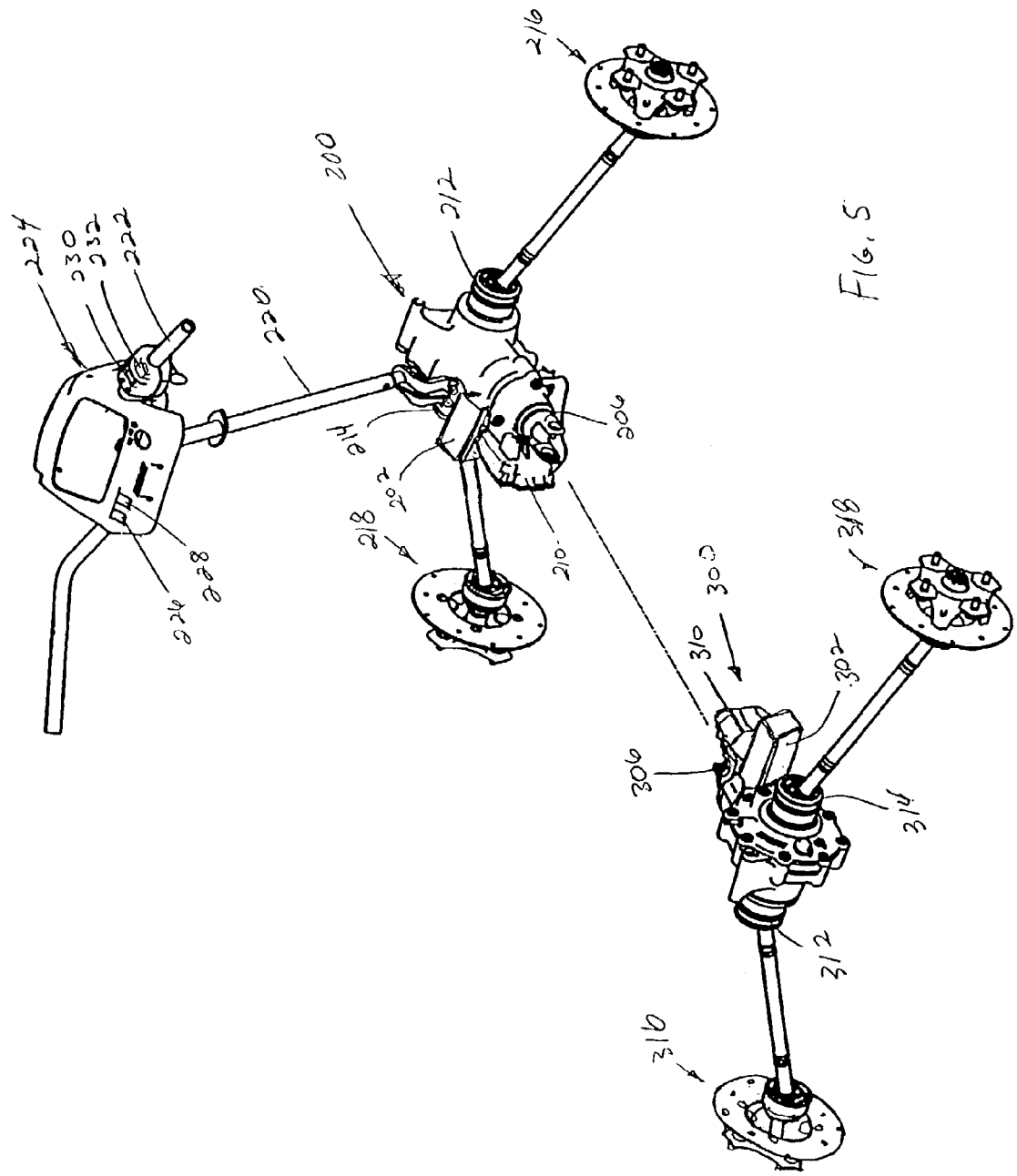
FIG. 5 is a perspective view of one example of unassembled front and rear portions of a vehicle transmission assembly.

As mentioned above, the features of transmissions 10 and 100 may be incorporated into either or both of a front-end and rear-end portion of a vehicle transmission. FIG. 5 illustrates front- and rear-end transmission portions 200, 300 that each include differentials (not shown) that are capable of being locked with a locking assembly 202, 302. Transmission portions 200, 300 include respective first and second universal joints 212, 214 and 312, 314 that are coupled to respective wheel hubs 216, 218 and 316, 318 that support wheels of the vehicle. Coupling the wheel hubs 216, 218 and 316, 318 to the respective first and second universal joints 212, 214 and 312, 314 may require additional drive shafts and universal joints. For example, first universal joint 312 shown in FIG. 5 may be "coupled" to hub 316 with a separate drive shaft 313 and a hub universal joint 317.

A steering column 220 with handlebars 222 and a control panel 224 for operation of a vehicle may also be associated with transmission portions 200, 300. A differential control operable for locking and unlocking the differentials in transmission portions 200, 300 may include separate front and rear drive controls 226, 228 that are mounted to control panel 224, handlebars 222, or other features of the vehicle so as to be accessible by the vehicle operator, and are individually operable to lock transmission portions 200, 300. In some embodiments, the differential control may be a unitary member that is capable of operating actuators of both assemblies 202, 302. The differential control and locking assemblies 202, 302 may be manually operated using, for example, levers or cables, or may be operated using electronic features.

The transmission portions 200, 300 are each driven by a power source (not shown), such as an engine or motor that provides rotational power to each transmission portion 200, 300. Connectors 206, 306 may be used to connect the power source to an input shaft (not shown) of each transmission portion. A drive engagement selector assembly 210, 310 (for example, having a configuration such as assembly 92 shown in FIGS. 1 and 4) may be associated with each transmission portion 200, 300 to engage or disengage the power source from the transmission portion (for example, using the electrical solenoid controlled drive coupler 90 shown in FIGS. 1 and 4). A drive selector control may be used to operate the drive engagement selector assemblies 210, 310. The drive selector control may include separate front and rear drive controls 230, 232 that are individually operable to control the front and rear drive engagement selector assemblies 210, 310, or may be a unitary member that is capable of operating both assemblies 210, 310. The drive selector controls 230, 232 may be positioned on the control panel 224, handlebars 222, or at other locations on a vehicle that are accessible by the vehicle operator. The drive selector control and drive engagement selector assemblies 210, 310 may be manually operable using, for example, levers or cables, or may be operated using electronic features.

A vehicle that includes a differential joint, a limited slip differential, and a drive engagement selector in each of the front- and rear-end portions of the transmission and may have multiple options for allocating power to different wheels of the vehicle. For example, the vehicle may be placed in either front wheel drive, rear wheel drive, all wheel drive, or no drive to the vehicle transmission depending on the various combinations of engagement and disengagement of the front and rear drive engagement selectors. If the vehicle transmission is completely disengaged from the vehicle power source by disengaging both the front and rear drive engagement selectors, power from the power source may be redirected for alternative functions associated with or separate from the vehicle such as, for example, running a generator, pump, or other accessory that can utilize the power output provided by the power source. Power from the power source can be redirected using, for example, a belt, chain, sprockets, gears, hydraulic pump, or universal joint assembly.

There are also several differential options for a vehicle that includes front and rear differentials and limited slip differentials such as, for example, front and rear locked differentials, front and rear limited slip differentials, front locked and rear limited slip differentials, and rear locked and front limited slip differentials, depending on the locked and unlocked position of the locking coupler of the front and rear locking assemblies.

In other embodiments that do not include a limited slip differential in one or both of the front and rear transmission portions, an open differential option may be available in the transmission portion that does not include the limited slip differential when the differential of that transmission portion is not locked.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A locking assembly configured to couple a ring gear of a differential assembly to first and second universal joints of a vehicle transmission assembly that are positioned at opposite sides of the ring gear, comprising;

a coupler having an external surface and an internal surface, the internal surface configured for engaging a radially outward facing surface of the ring gear and a radially outward facing surface of the first universal joint;

an actuator capable of engaging the external surface of the coupler to move the coupler between an engaged position in which the coupler is coupled to the ring gear and the first universal joint, and a disengaged position in which the coupler is coupled to the ring gear or the first universal joint;

whereby in the engaged position the first and second universal joints rotate together.

2. The assembly of claim 1 wherein the first and second universal joints are coaxially aligned and define a transmission width, and the coupler is positioned between the first and second universal joints and has a width that contributes to the transmission width, and the coupler is configured to minimize the transmission width.

3. The assembly of claim 2, wherein the first and second universal joints are configured to be movable relative to each other when the coupler is in the disengaged position.

4. The assembly of claim 1 wherein the inner surface of the coupler includes splines and the radially outward facing surfaces of the first universal joint and ring gear comprise splines configured to engage the inner surface splines of the coupler.

5. The assembly of claim 1 wherein the outer surface of the coupler comprises a groove and the actuator engages the groove to move the coupler.

6. The assembly of claim 1 wherein the actuator comprises:
   a shaft aligned substantially parallel with an axis of the first universal joint;
   an engagement portion secured to the shaft and extending generally perpendicular to the axis of the first universal joint, the engagement portion engaging the outer surface of the coupler;
   whereby linear movement of the shaft in a direction parallel to the axis of the first universal joint moves the engagement portion between a first position corresponding to the engaged position and a second position corresponding to the disengaged position.

7. The assembly of claim 1 wherein the actuator is activated by a cable.

8. The assembly of claim 1 wherein the actuator is activated by a lever.

9. The assembly of claim 1 wherein the actuator is activated by an electronic device.

10. The assembly of claim 1 wherein the first universal joint includes a constant velocity assembly.

11. The assembly of claim 1 wherein the second universal joint includes a constant velocity assembly.

12. An all-terrain vehicle, comprising:
    an engine; and
    a transmission comprising the locking assembly of claim 1.

13. The assembly of claim 1 wherein the actuator includes a fork-shaped portion configured to engage the external surface of the coupler.

14. An all-terrain vehicle, comprising:
    an engine; and
    a transmission including a front portion having a front differential joint and a rear portion having a rear differential joint, and each of the front and rear transmission portions comprises a locking assembly configured to couple a ring gear of a differential assembly to first and second universal joints of a vehicle transmission assembly that are positioned at opposite sides of the ring gear, the locking assemblies comprising:
    a coupler having an external surface and an internal surface, the internal surface configured for engaging radially outward facing surface of the ring gear and a radially outward facing surface of the first universal joint;
    an actuator capable of engaging the external surface of the coupler to move the coupler between an engaged position in which the coupler is coupled to the ring gear and the first universal joint, and a disengaged position in which the coupler is coupled to the ring gear or the first universal joint;
    whereby in the engaged position the first and second universal joints rotate together.

15. A method of locking a differential joint of an ATV transmission, the transmission comprising a coupler having an inner surface and an outer surface, a universal joint having radially outward facing surface, and an actuator, the differential joint including a ring gear having a radially outward facing surface, the method comprising the steps of;
    engaging the outer surface of the coupler with the actuator; and
    activating the actuator to move the coupler between a first position wherein the inner surface of the coupler directly engages the radially outward facing surface of the universal joint or the radially outward facing surface of the ring gear, and a second position wherein the inner surface of the coupler engages the radially outward facing surface of the universal joint and the radially outward facing surface of the ring gear;
    whereby when the coupler is in the second position the universal joint and the differential joint are locked together for rotation about a common axis.

16. The method of claim 15 wherein the inner surface of the coupler includes splines, and the radially outward facing surface of the ring gear and the radially outward facing surface of the universal joint include splines, and moving the coupler between first and second positions includes engaging the universal joint splints and the differential splines with the coupler splines.

17. The method of claim 15 wherein the outer surface of the coupler includes a groove, and the engaging step includes engaging the groove with the actuator.

18. The method of claim 15 further comprising the step of positioning the actuator adjacent the universal joint.

19. The method of claim 15 wherein the coupler engages only the universal joint in the first position so as to rotate with the universal joint independent of the ring gear.

20. The method of claim 15 wherein the coupler engages only the ring gear in the first position so as to rotate with the ring gear independent of the universal joint.

21. The method of claim 15 wherein the universal joint is a constant velocity joint.

22. An all-terrain vehicle (ATV) transmission, comprising:
    a main drive shaft;
    a rear transmission assembly configured to control a set of rear wheels, the rear transmission assembly including:
        a rear input shaft that extends coaxially with the main drive shaft;
        a rear differential assembly coupled to the rear wheels, the rear differential assembly including a ring gear engaged and driven by the rear input shaft;
        first and second rear universal joints coupled between the rear differential and the set of rear wheels, and configured to rotate about an axis substantially perpendicular to the main drive shaft;
        a locking coupler configured to lock the ring gear to the first and second rear universal joints to fix a rotation of the rear wheels together; and a first drive coupler configured to move between a first position coupling the main drive shaft to the rear input shaft, and a second position wherein the main drive shaft is disengaged from the rear input shaft.

23. The transmission of claim 22, further comprising a front transmission assembly configured to control a set of front wheels of the ATV, the front transmission assembly including:
   a front input shaft that extends coaxially with the main drive shaft;
   a front differential assembly coupled to the front wheels;
   a locking coupler configured to lock the front differential assembly to fix rotation of the front wheels together; and
   a second drive coupler configured to move between a first position coupling the main drive shaft to the front input shaft, and a second position wherein the main drive shaft is disengaged from the front input shaft.

24. The transmission of claim 22, wherein the rear differential assembly includes spider gears configured to provide a differential action in the rear transmission assembly.

25. The transmission of claim 22, wherein the ring gear includes a radially outward facing surface and the locking coupler is configured to engage the radially outward facing surface and at least one of the first and second rear universal joints to lock the differential assembly.

26. An all-terrain vehicle, comprising:
   the transmission of claim 22; and
   an engine providing power to the transmission assembly.

27. An ATV transmission assembly configured to control motion of a set of rear wheels of the ATV, comprising:
   an input shaft aligned coaxially with a drive shaft of the ATV, the input shaft being axially spaced apart from the drive shaft;
   a rear differential coupled between the input shaft and the rear wheels;
   a locking coupler positioned between the rear differential and at least one of the rear wheels and being movable between an unlocked position wherein the rear wheels are rotatable relative to each other, and a locked position wherein the differential is locked and the rear wheels are rotatable together; and
   a drive selector positioned between the input shaft and the drive shaft, and configured to selectively engage and disengage the input shaft from the drive shaft.

28. The assembly of claim 27, wherein the rear differential includes a ring gear coupled to the input shaft and spider gears coupled to the ring gear.

29. The assembly of claim 28, further comprising first and second universal joints coupled to the rear wheels and positioned between the rear wheels and the spider gears.

30. The assembly of claim 29, further comprising a limited slip differential operable between at least one of the first and second universal joints and the spider gears.

31. The assembly of claim 30, wherein the locking coupler is configured to engage the ring gear and at least the first or second universal joint in a locked position, and is configured to engage the ring gear or the at least first or second universal joint in an unlocked position, wherein the rear wheels are free to move independent of each other subject to the limited slip differential when the locking coupler is in the unlocked position.

32. An ATV transmission assembly, comprising:
   a front assembly having a front differential, a front locking coupler configured to lock the front differential, and a front drive engagement selector operable to disengage the front assembly from a power source, the front drive engagement selector being operable separately from the front locking coupler;
   a rear assembly having a rear differential, a rear locking coupler configured to lock the rear differential, and a rear drive engagement selector operable to disengage the rear assembly from a power source, the front drive engagement selector being operable separately from the front locking coupler; and
   wherein the front and rear drive engagement selectors are operable to disengage both the front and rear assemblies from the power source, such that power from the power source is capable of being directed away from the transmission assembly when the front and rear assemblies are disengaged from the power source.

33. An all-terrain vehicle (ATV) transmission, comprising:
   a main drive shaft;
   a rear transmission assembly configured to control a set of rear wheels, the rear transmission assembly including:
      a rear input shaft that extends coaxially with the main drive shaft;
      a rear differential assembly coupled to the rear wheels, the rear differential assembly including a ring gear engaged and driven by the rear input shaft;
      first and second rear universal joints coupled between the rear differential and the set of rear wheels, and configured to rotate about an axis substantially perpendicular to the main drive shaft;
      a locking coupler configured to lock the ring gear to the first and second rear universal joints to fix a rotation of the rear wheels together; and
      a first drive coupler configured to move between a first position coupling the main drive shaft to the rear input shaft, and a second position wherein the main drive shaft is disengaged from the rear input shaft; and
   a front transmission assembly configured to control a set of front wheels of the ATV, the front transmission assembly including:
      a front input shaft that extends coaxially with the main drive shaft;
      a front differential assembly coupled to the front wheels; and
      a locking coupler configured to lock the front differential assembly to fix rotation of the front wheels together; and
      a second drive coupler configured to move between a first position coupling the main drive shaft to the front input shaft, and a second position wherein the main drive shaft is disengaged from the front input shaft.

* * * * *